Feb. 20, 1968  N. C. BROWNELL  3,369,317
SYNTHETIC FISHNET CONSTRUCTION
Filed April 20, 1965

INVENTOR.
NATHAN C. BROWNELL
BY
*Mc Cormick, Paulding & Huber*
ATTORNEYS

United States Patent Office 3,369,317
Patented Feb. 20, 1968

3,369,317
SYNTHETIC FISHNET CONSTRUCTION
Nathan C. Brownell, East Haddam, Conn., assignor to Brownell & Company, Incorporated, Moodus, Conn., a corporation of Connecticut
Filed Apr. 20, 1965, Ser. No. 449,454
5 Claims. (Cl. 43—7)

ABSTRACT OF THE DISCLOSURE

A fishnet construction consisting of lengths of synthetic twine each of which comprises several continuous monofilaments loosely twisted together with less than four twists per monofilament per inch. The number of such monofilaments lies preferably in the range between 5 and 10, and each monofilament is approximately 10 mils in diameter.

---

This invention relates to synthetic fishnets, and deals more particularly with a fishnet which is so constructed as to have a low degree of visibility when immersed in water.

Synthetic twine has long been recognized as an advantageous substitute for cotton or linen twine in the manufacture of fishnets. The latter type of twine is relatively short lived under the action of sun, water and normal fishing usage. Synthetic twine and more particularly nylon twine has proven quite durable in this application. Nylon is usually supplied to the makers of fishnets in either one of two fairly well standarized forms. The most common form of nylon twine is made from a great number of relatively small diameter fibers or threads which may be continuous or staple and in either case are combined to form a yarnlike filament which is then twisted together with other such yarnlike filaments to form the twine. The physical make-up of this twine corresponds quite closely to that of conventional cotton or linen twine and in fact the yarnlike filaments could be used for weaving a fabric as well as in twine or rope making. It will be apparent that the weight, or denier, of this type of twine is directly proportional to the number of yarnlike filaments which are used in the twisting of this twine. Twine made from these yarnlike filaments is relatively soft and flexible, and in fact possesses all the characteristics of cotton or linen twine with the additional advantage of being relatively immune to the action of the sun and water, etc. In short, nylon twine made from yarnlike filaments of the type just described has proven quite useful in the manufacture of fishnets. However, this type of nylon twine like the cotton twine used heretofore, has a relatively high degree of visibility when immersed in water and therefore is no more desirable than the cotton twine from the point of view of the number of fish which can be caught in a net constructed from such twine.

In order to overcome the relatively high degree of visibility of these yarnlike, or regular nylon filaments, the manufacturers of fishnets have sometimes used a single extruded nylon wire or monofilament in making fishnets of low visibility. It has been found that netting so constructed is nearly invisible when immersed in water and consequently provides a more effective fishnet by a factor of at least two to one and in some cases by as great as seven to one. The low visibility of such a net can be attributed to two factors which combine to reduce the visibility of the nylon. First, the surface area of the single monofilament is much less than the total surface area of the more conventional nylon twine which has hundreds of individual fibers or threads to reflect light and thereby alert the fish. Second, the index of refraction of extruded nylon is approximately equal to that of water. A monofilament net does have definite disadvantages, however, and these are listed below in increasing order of importance. First, the monofilament is not as strong for a given weight net. Second, it is not as flexible. Third, if suffers quite seriously from knot slippage. Fourth, and perhaps the most serious of its drawbacks, monofilament netting has been outlawed in a number of states and cannot be used by commercial fishermen in areas where its benefits would be most rewarding.

The object of the present invention is to provide a fishnet which presents a nice compromise between the highly visible conventional and the relatively invisible prohibited net.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Figure 1:
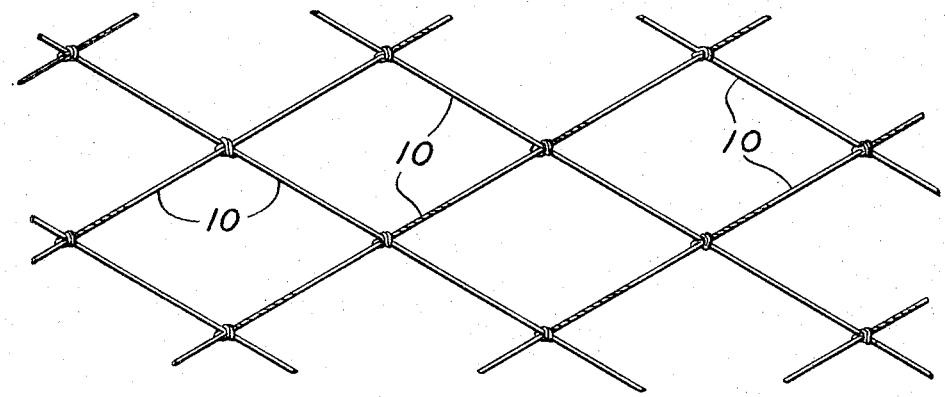
FIG. 1 is a plan view of a fishnet constructed in accordance with the present invention.

Referring now to the drawing in greater detail, a net of the present invention is shown in FIG. 1 as comprising a number of lengths of synthetic twine knotted together at intervals to form the desired open mesh of the fishnet. Lengths of twine 10, 10 are fed into a knotting machine where they are knotted to form the net. These knots may comprise single weaver's knots or any other convenient form of knot without departing from the scope of the invention.

Figure 2:
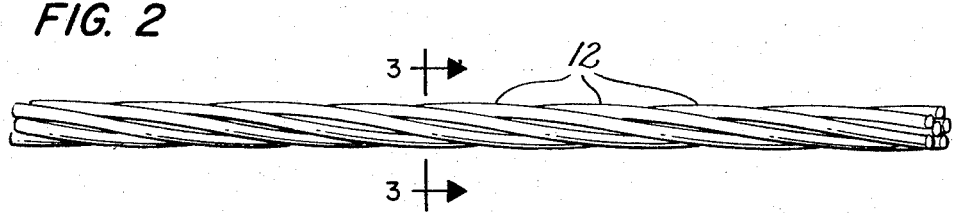
FIG. 2 is an enlarged plan view of a length of twine used in the making of the net shown in FIG. 1.
Figure 3:
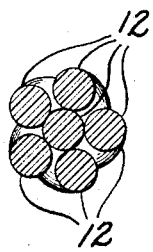
FIG. 3 is a cross sectional view of the twine shown in FIG. 2 and is taken along the line 3—3 of that figure.
Figure 4:
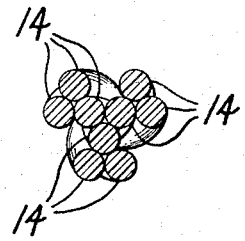
FIG. 4 is a cross sectional view of an alternative twine construction and is otherwise similar to FIG. 3.

In accordance with the present invention, the fishnet consists mainly of lengths of synthetic twine, each of which comprises a plurality of continuous monofilaments or strands 12, 12 loosely twisted together with less than four twists per monofilament per inch as shown in FIG. 2. Preferably, and as shown, the number of said monofilaments 12, 12 in a single length of the synthetic twine 10 is more than five but less than 10 and in any event, the number of monofilaments does not exceed fifty and, of course, comprises more than the single monofilament used in making the outlawed net discussed above. FIG. 3 shows six monofilaments used in the net of FIG. 1 and FIG. 4 shows an alternative construction utilizing nine such filaments 14, 14 in a braided configuration as distinguished from the side twisted configuration shown in FIG. 3. It will be seen, therefore, that the precise manner in which the monofilaments are twisted together is not essential to the present invention and as long as the number of such monofilaments is greater than one but does not approach the great number of filaments of yarnlike consistency used in the manufacture of conventional nylon twine, the more significant advantages of the present invention can be realized.

By way of comparison three nets of comparable open mesh and of comparable strength will now be described. The first net corresponds to the conventional synthetic twine net alluded to above and comprises a triple braided nylon twine which is made up of 306 individual filaments each of which has a diameter of approximately one tenth of a mil. Such a twine has a tensile strength of 32 pounds and weighs 1,890 denier. As mentioned hereinabove, such a net is very soft and flexible and has good resistance to knot slippage. In addition, it is quite strong for its cross sectional size as will be seen hereinbelow. The major disadvantage to such a net is its high degree of visibility when immersed in water.

The second net corresponds to the prohibited monofilament net discussed previously. By way of comparison, such a net was knotted from a single strand of 21 mil nylon monofilament which has a tensile strength of about 25 pounds. The weight of such a twine is 2,300 denier, or more than twenty per cent (20%) higher than the weight of the more conventional "regular" nylon filament twine. Such a net is virtually invisible when immersed in water but suffers from several disadvantages in addition to the lower strength to diameter ratio characteristics of monofilament nylon as opposed to "regular" filament. It is subject to knot slippage due to its relatively smooth exterior surface, and is illegal in most fishing areas contiguous to the United States.

Finally, the third net to be considered is constructed in accordance with FIGS. 2 and 3 of the drawing and comprises six nylon monofilaments loosely twisted together with approximately two twists per inch. Each monofilament is 10 mils in diameter and the combined weight of the resulting twine is 3120 denier. It has a tensile strength of 30 pounds. It will be noted that such a net is somewhat bulkier than either of the nylon nets just described, as indicated by the increase in denier. However, by using only six monofilaments, as opposed to the over three hundred yarnlike filaments in the conventional net first described, the visibility of this net approaches the ideal of the single strand monofilament net.

In conclusion, it should perhaps be noted that while extruded nylon provides an ideal material from which a net of the present invention can be constructed, other synthetic materials having an index of refraction approximately equal to that of water and having sufficient strength and durability to withstand the action of sun, water and normal fishing usage might be used to realize the major advantage of the present invention, namely to provide a fishnet which is substantially invisible when immersed in water, but which is not outlawed by local fishing regulations. For example, any substantially transparent polyamide synthetic monofilaments which possesses an index of refraction comparable to that of water (1.33) would be as satisfactory as extruded nylon itself which has an index of approximately 1.5. More broadly, other synthetics might be used to advantage in making fishnets within the scope of the appended claims. Polypropylene filaments have been found quite satisfactory in this latter category in spite of the lower tensile strength of this material as opposed to nylon.

The invention claimed is:

1. A fishnet consisting mainly of lengths of synthetic twine knotted together at intervals to form the desired open mesh of the fishnet, each of said lengths of twine comprising a plurality of continuous monofilaments loosely twisted together with less than four twists per monofilament per inch, each of said monofilaments having a diameter in the range between 6 and 60 mils and each of said monofilaments being substantially invisible when immersed in water.

2. A fishnet as set forth in claim 1 wherein the number of said monofilaments in a single length of said twine lies in the range between 5 and 10.

3. A fishnet as set forth in claim 2 wherein said synthetic monofilaments comprise a transparent material having a refractive index comparable to that of water.

4. A fishnet as set forth in claim 2 wherein said synthetic monofilaments comprise extruded nylon having a refractive index of approximately 1.5.

5. A fishnet as set forth in claim 2 wherein said synthetic monofilaments comprise extruded polypropylene having a refractive index comparable to that of water.

References Cited

UNITED STATES PATENTS

| | | | |
|---|---|---|---|
| 2,590,586 | 3/1952 | Thompson et al. | 87—12 X |
| 2,653,372 | 9/1953 | Johnson et al. | 43—7 |
| 2,823,575 | 2/1958 | Needham | 87—12 X |
| 2,999,413 | 9/1961 | Momoi | 43—7 X |
| 3,015,150 | 1/1962 | Fior | 57—140 |
| 3,041,915 | 7/1962 | Ryffel | 87—12 |
| 3,057,040 | 10/1962 | Cuculo | 43—44.98 X |
| 3,164,947 | 1/1965 | Gaston | 57—140 |

SAMUEL KOREN, *Primary Examiner.*

WARNER H. CAMP, *Examiner.*